May 31, 1927.
L. STABILE
LOCK FOR STEERING WHEELS
Filed Nov. 20, 1926
1,630,979
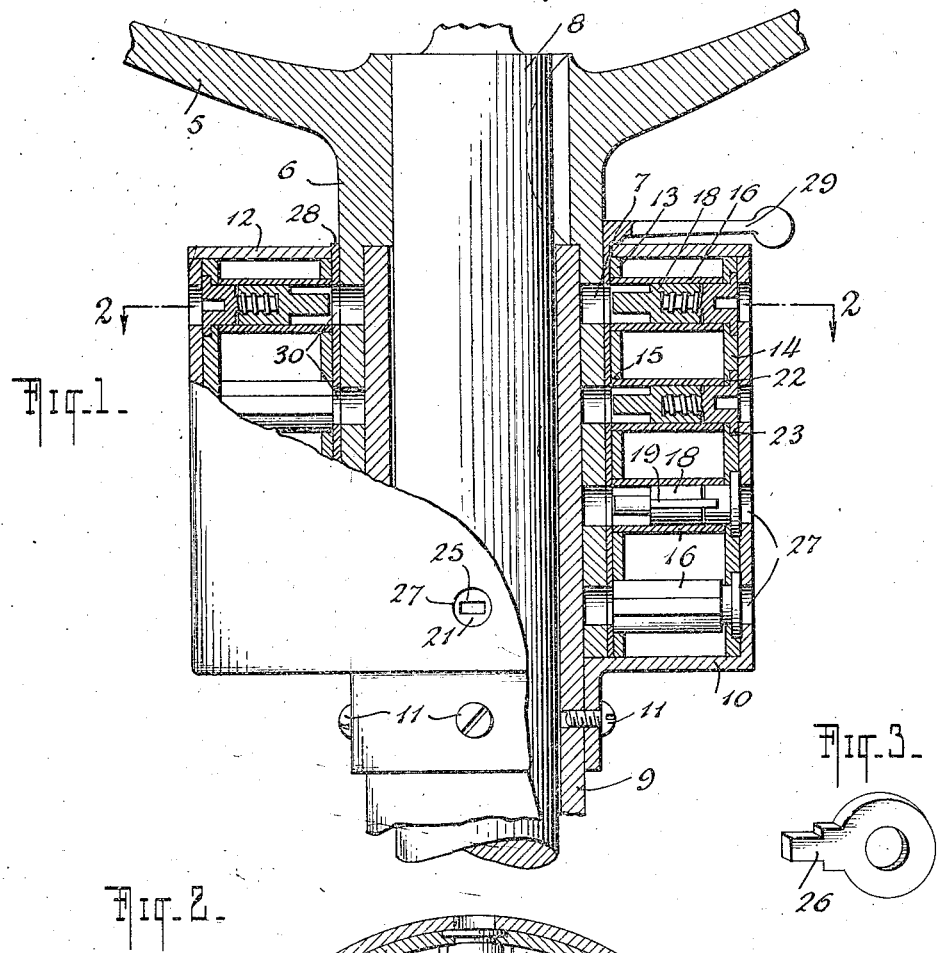
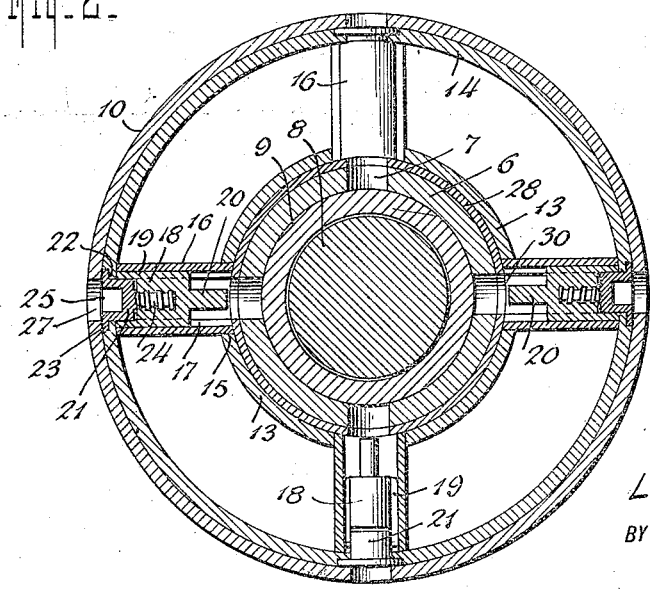
INVENTOR
LOUIS STABILE
BY Richards & Geier
ATTORNEYS Patented May 31, 1927.

1,630,979

UNITED STATES PATENT OFFICE.

LOUIS STABILE, OF BROOKLYN, NEW YORK.

LOCK FOR STEERING WHEELS.

Application filed November 20, 1926. Serial No. 149,550.

This invention relates to improvements in locks, and has particular reference to a lock for the steering wheel of a motor vahicle.

An object of the invention is to provide an improved lock of simple and pratical construction which can be conveniently mounted upon a portion of the steering wheel to lock the same to the steering column and which will be effective in preventing the unlocking of the steering wheel by unauthorized persons.

Another object is to mount a plurality of locking elements within a lock casing carried by a portion of the steering wheel and to so connect said elements with actuating members therefor that said elements can be properly manipulated to lock and unlock the wheel only by a person having knowledge of the particular manner in which the various actuating members are to be operated.

The above and other objects will appear more clearly from the following detail description, when taken in connection with the accompanying drawing, which illustrates a preferred embodiment of the inventive idea.

In the drawing—

Figure 1 is a fragmentary longitudinal section through a steering wheel and its mounting with the lock of the present invention applied thereto;

Figure 2 is a section taken substantially on the line 2—2 of Figure 1; and

Figure 3 is a perspective view of a key employed for locking and unlocking the steering wheel.

Referring more particularly to the accompanying drawing, the numeral 5 indicates the steering wheel of a vehicle, the hub 6 of which, for purposes of the present invention, is made longer than usual and provided with four series of openings 7 with the openings of each series extending longitudinally of the hub. Each series contains four openings, but it will, of course, be understood that the number of series and the number of openings in each series may be varied at will without departing from the spirit or scope of the invention. The purpose of these openings 7 will appear in the course of the description. The steering wheel 5, as usual, is keyed to the steering shaft 8 which is mounted for rotation in the stationary steering column 9.

The lock of the present invention consists of a casing 10 cylindrical in cross section and adapted to be mounted upon the hub 6 in encircling relation thereto and secured in position thereon by means of screws 11. The end of the casing opposite that secured to the hub is open and provided with a removable closure plate 12 so that access may be had to the interior of the casing, if necessary.

Within the casing 10 there is secured the inner and outer tubular members 13 and 14, respectively. The member 13 is provided with series of openings 15 and the openings of each series register with the openings 7 in an adjacent series. Extending from each of the openings 15 to the inner surface of the outer member 14 is a sleeve 16 provided with opposed longitudinally extending grooves 17. A locking element 18 having ribs 19 fitting in the grooves 17 is mounted for sliding movement in each of the sleeves 16 and is provided upon its inner end with an extension 20 which projects into the adjacent opening 7 in the hub 6 when the locking element is moved inwardly. The movements of the locking element are controlled by means of an actuating member 21 rotatably mounted in an opening 22 formed in the outer member 14, the head of the member 21 being recessed within said opening and having an annular flange 23 which is interposed between the member 14 and the outer wall of the casing 10 so as to prevent longitudinal movement of the actuating member. The inner end of the latter member is provided with a screw threaded shank 24 engageable in a threaded recess in the locking element 18 so that when the member 21 is rotated the locking element 18 will be moved longitudinally of the sleeve 16 into and out of the associated opening 7. When the extension 20 of the locking element is engaged in said opening, it will be apparent that the hub of the wheel is locked to the steering column 9 to which the casing 10 is attached and hence said wheel cannot be rotated to impart a similar movement to the shaft 8. The head of each actuating member 21 is provided with a recess 25 for the reception of the end of a key 26 which may be inserted through an opening 27 in the casing 10.

In order to make it virtually impossible for an unauthorized person to unlock the steering wheel, certain of the actuating members 21 have their shanks 24 provided with right-hand threads, while the others of said members are provided with left-hand threads so that a person unfamiliar with the manner in which the threads of the various actuating members are pitched may turn any one of said members and not know whether the associated locking element is being moved inwardly to locking position, or outwardly to unlocking position. By providing such a construction, it will be realized that with sixteen locking elements, as indicated in the drawing, many various combinations of right and left-hand screw threaded actuating members may be obtained.

It is desirable, when the wheel is unlocked, to cover the openings 7 in the different series so that it will be impossible for any one of the locking elements to be accidentally or otherwise moved inwardly into engagement with its opening 7. For this purpose there is provided a sleeve 28 rotatably mounted within the casing 10 and surrounding the hub 6 with a projecting portion of said sleeve provided with a handle 29 which will permit of its rotation. The sleeve is provided with series of openings 30 designed to be aligned with the openings 7 and the locking elements and through which openings 30 the latter elements may be projected when being moved to locking position. After the wheel is unlocked by the retraction of all of the locking elements the sleeve 28 may be rotated to cover the openings 7 so that no one of the locking elements may be projected into its corresponding opening.

What is claimed is:

1. In a lock, the combination with a steering wheel and a steering column therefor; of a lock casing carried by said column, a plurality of locking elements in said casing movable into and out of engagement with a portion of said wheel to lock the same to said column and unlock said wheel therefrom, and means rotatable relative to each element to move the same to locking and unlocking positions.

2. In a lock, the combination with a steering wheel and a steering column therefor; of a lock casing carried by said column, a plurality of locking elements in said casing movable into and out of engagement with a portion of said wheel to lock the same to said column and unlock said wheel therefrom, and an actuating member for each of said elements rotatably mounted in said casing and operable by its rotation to move its associated element into locking and unlocking position.

3. In a lock, the combination with a steering wheel and a steering column therefor; of a lock casing carried by said column, a plurality of locking elements in said casing movable into and out of engagement with a portion of said wheel to lock the same to said column and unlock said wheel therefrom, and an actuating member for each of said elements rotatably mounted in said casing and operable by its rotation to move its associated element into locking and unlocking position, certain of said actuating members being rotatable in a different direction from the others to move their locking elements to locking positions.

4. In a lock, the combination with a steering wheel and a steering column therefor; of a lock casing carried by said column, a plurality of locking elements in said casing movable into and out of engagement with a portion of said wheel to lock the same to said column and unlock said wheel therefrom, an actuating member for each of said elements rotatably mounted in said casing and operable by its rotation to move its associated element into locking and unlocking position, and a sleeve adjustable in said casing to a position to prevent engagement of said locking elements with said portion of the wheel.

5. In a lock, the combination with a steering wheel and a steering column therefor; of a lock casing carried by said column, a plurality of locking elements in said casing movable into and out of engagement with a portion of said wheel to lock the same to said column and unlock said wheel therefrom, an actuating member for each of said elements rotatably mounted in said casing and operable by its rotation to move its associated element into locking and unlocking position, certain of said actuating members being rotatable in a different direction from the others to move their locking elements to locking positions, and a sleeve adjustable in said casing to a position to prevent engagement of said locking elements with said portion of the wheel.

6. In a lock, the combination with a steering wheel having a hub provided with series of openings, and a steering column for said wheel; of a lock casing carried by said column and encircling said hub, series of locking elements each associated with one series of openings in said hub and each locking element of a series being movable into and out of engagement with one of the openings of the associated series, a sleeve in which each locking element is longitudinally movable, and an actuating member for each of said elements rotatably mounted in said sleeve and having screw threaded engagement with its locking element to move the same to locking and unlocking position.

7. In a lock, the combination with a steering wheel having a hub provided with series of openings, and a steering column for said wheel; of a lock casing carried by said column and encircling said hub, series of locking elements each associated with one series of openings in said hub and each locking element of a series being movable into and out of engagement with one of the openings of the associated series, a sleeve in which each locking element is longitudinally movable, and an actuating member for each of said elements rotatably mounted in said sleeve and having screw threaded engagement with its locking element to move the same to locking and unlocking position, the screw threads of certain of said actuating members being of opposite pitch to the threads of other members.

8. In a lock, the combination with a steering wheel having a hub provided with series of openings, and a steering column for said wheel; of a lock casing carried by said column and encircling said hub, series of locking elements each associated with one series of openings in said hub and each locking element of a series being movable into and out of engagement with one of the openings of the associated series, a sleeve in which each locking element is longitudinally movable, an actuating member for each of said elements rotatably mounted in said sleeve and having screw threaded engagement with its locking element to move the same to locking and unlocking position, and a sleeve member rotatable in said casing and movable to a position therein to prevent any one of said locking elements being moved to locking position.

9. In a lock, the combination with a steering wheel having a hub provided with series of openings, and a steering column for said wheel; of a lock casing carried by said column and encircling said hub, series of locking elements each associated with one series of openings in said hub and each locking element of a series being movable into and out of engagement with one of the openings of the associated series, a sleeve in which each locking element is longitudinally movable, an actuating member for each of said elements rotatably mounted in said sleeve and having screw threaded engagement with its locking element to move the same to locking and unlocking position, the screw threads of certain of said actuating members being of opposite pitch to the threads of other members, and a sleeve member rotatable in said casing and movable to a position therein to prevent any one of said locking elements being moved to locking position.

In testimony whereof I have affixed my signature.

LOUIS STABILE.